(Model.)

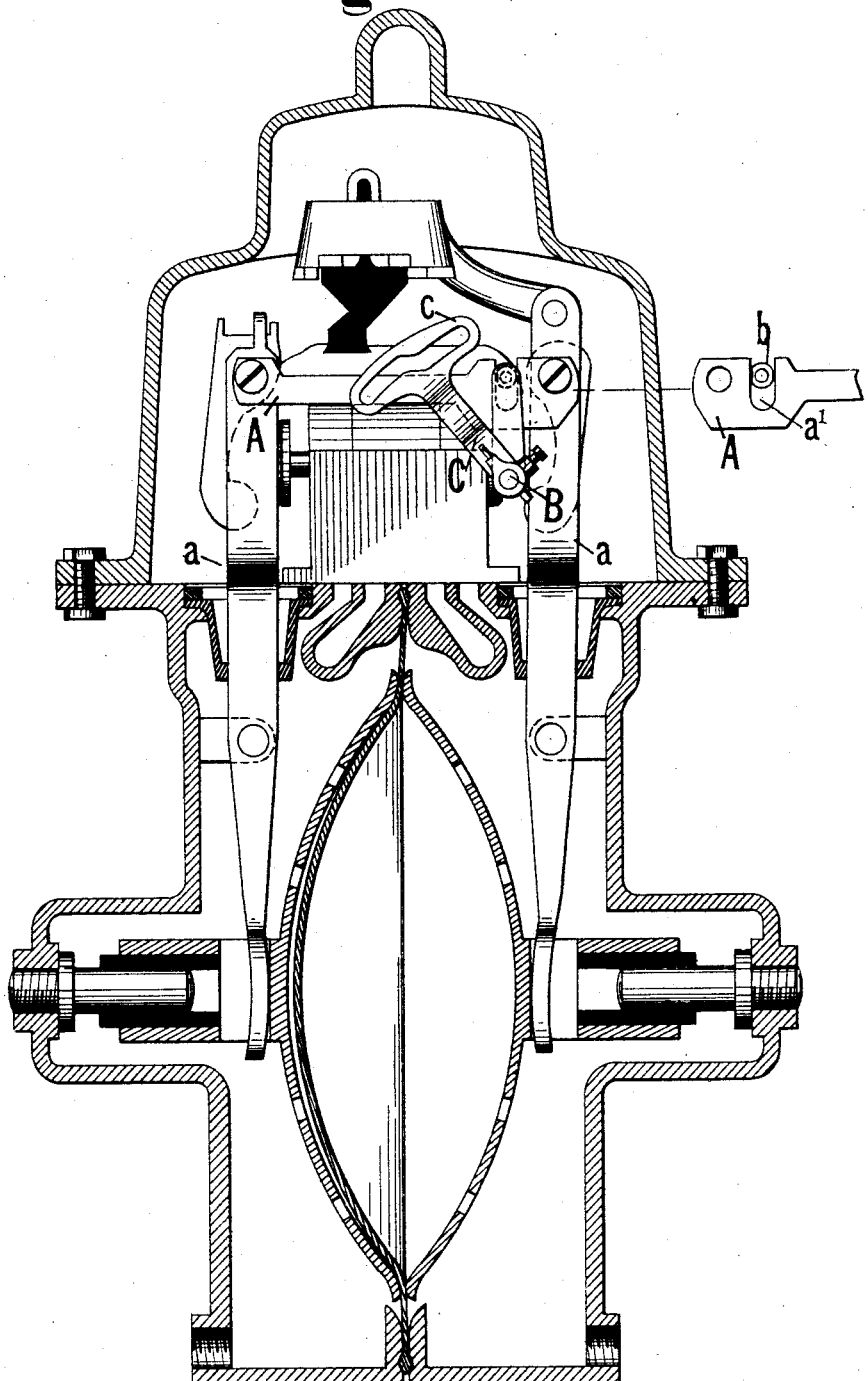

3 Sheets—Sheet 3.

D. B. SPOONER.
METHOD OF AND REGISTERING MECHANISM FOR DETERMINING THE AMOUNT OF THE FLOW OF WATER THROUGH A METER.

No. 287,588. Patented Oct. 30, 1883.

WITNESSES:
T. S. West
Wm. T. Emerson

INVENTOR:
D. B. SPOONER,
BY H. W. Beadle + Co.
ATTYS.

UNITED STATES PATENT OFFICE.

D. BRAINERD SPOONER, OF BOSTON, MASSACHUSETTS.

METHOD OF AND REGISTERING MECHANISM FOR DETERMINING THE AMOUNT OF THE FLOW OF WATER THROUGH A METER.

SPECIFICATION forming part of Letters Patent No. 287,588, dated October 30, 1883.

Application filed September 28, 1883. (Model.)

*To all whom it may concern:*

Be it known that I, D. BRAINERD SPOONER, of Boston, county of Suffolk, and State of Massachusetts, have invented a new Method of Determining the Amount of the Flow of Water through Meters; and I do hereby declare that the following is a full and exact description of the same, reference being had to the accompanying drawings, and to the letters of reference marked thereon.

This invention is a novel method of determining the amount of water passing through a meter; and it consists, essentially, in taking as a basis of measurement the entire distance traveled by the moving part of the diaphragm or piston at each vibration, instead of taking the vibration itself, without regard to its length.

The method heretofore employed for measuring the flow of liquids through meters has been to take as a basis of measurement the vibrations or pulsations of the machine, it being assumed that each pulsation or vibration represented an equal volume of liquid. It has been found, however, in practice, that the amount delivered at each vibration varies somewhat according to the amount of pressure exerted, a greater volume being delivered under a high pressure than under a low one, provided the outlet is the same. This difference in volume results from the inertia of the moving part under rapid action, the length of the throw or travel of the same being thereby increased more or less, according to the circumstances of the case. Special mechanism is employed to carry this method practically into effect, as will be hereinafter described.

Figure 7:
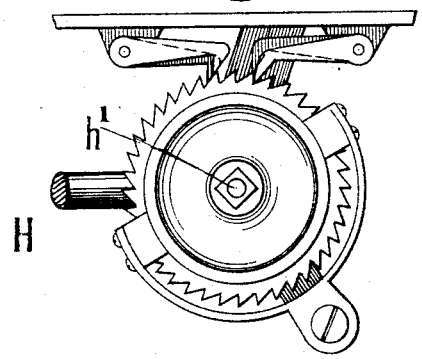
Figure 8:
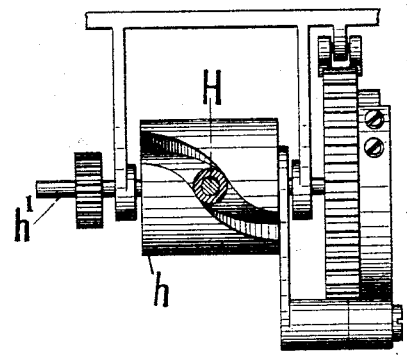
Figure 9:
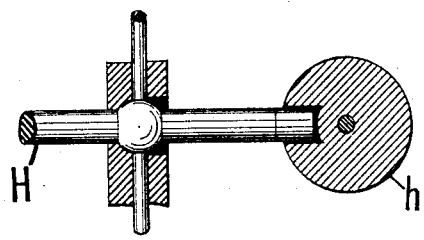
Figure 10:
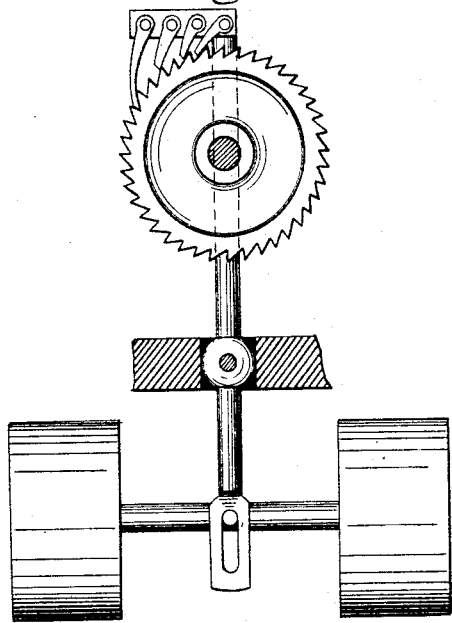

In the drawings, Figure 1 represents a side elevation of the cap portion of a meter with my special mechanism applied thereto; Figs. 2, 3, 4, and 5, enlarged views of parts detached; and Fig. 6, a partial vertical sectional elevation of a meter, showing the relation of the disk system and valve system to the registering mechanism; Figs. 7, 8, and 9, several views of one modification of the intermediate mechanism for actuating the register, and Fig. 10 a view of another modification of the same.

To enable others skilled in the art to understand my method and to carry it practially into effect, I will proceed to describe the same fully and the special mechanism employed in connection therewith.

The method is substantially as follows: The entire distance traveled at each vibration by any proper moving part of the water-delivering apparatus is made the basis of measurement, this distance, whether it be more or less, being communicated by proper intermediate mechanism to any proper registering mechanism.

The construction of the mechanism employed is substantially as follows:

A, Figs. 3 and 6, represents a yoke-bar, by means of which the upper ends of the disk lever-arms $a\ a$, Fig. 6, are united together and made to move in unison.

$a'$, Figs. 3 and 7, represents a notch or recess in the yoke-bar, as shown.

B, Figs. 1 and 3, represents a rock-shaft held by any proper stuffing-box in the wall of the meter-cap, as shown, which is provided, within the cap, with a crank-arm having a crank-pin, with hard-rubber block $b$, Figs. 3 and 6, adapted to lie in the notch or recess of the yoke-bar A, as shown.

C, Figs. 1, 3, and 6, represents a bent arm attached at one end to the end of the rock-shaft B, upon the outside of the meter, which is provided at its free end with the lateral extension $c$, Figs. 3 and 6, having a cam-slot, as shown.

D, Figs. 1, 2, and 3, represents a shaft supported by proper standards depending from the lower plate of the register, as shown, which is provided on the end next the meter with a crank, $d$, loose thereon, Figs. 2, 3, and 4, having a pin, $d'$, Fig. 2, with friction-roller, as shown.

$d^2$ represents an extended portion of the crank-arm, by means of which the parts are properly balanced.

$d^3$, Figs. 2, 3, 4, and 5, represents an upwardly-extending arm having four or more pawls, $d^4\ d^4\ d^4\ d^4$, as shown.

E, Figs. 1, 3, and 5, represents a ratchet-wheel upon the shaft, and $d^4\ d^4\ d^4\ d^4$ the pawls a ratchet-wheel and series of pawls adapted to register the entire travel of the vibrating movements of unequal length.

4. In combination with a reciprocating diaphragm or disks, or a reciprocating piston adapted to travel unequal distances, a registering mechanism, substantially as described, adapted to record the exact distance traveled.

This specification signed and witnessed this 27th day of September, 1883.

D. B. SPOONER.

(No Model.) 3 Sheets—Sheet 1.
E. WELTE.
MECHANICAL MUSICAL INSTRUMENT.
No. 287,599. Patented Oct. 30, 1883.
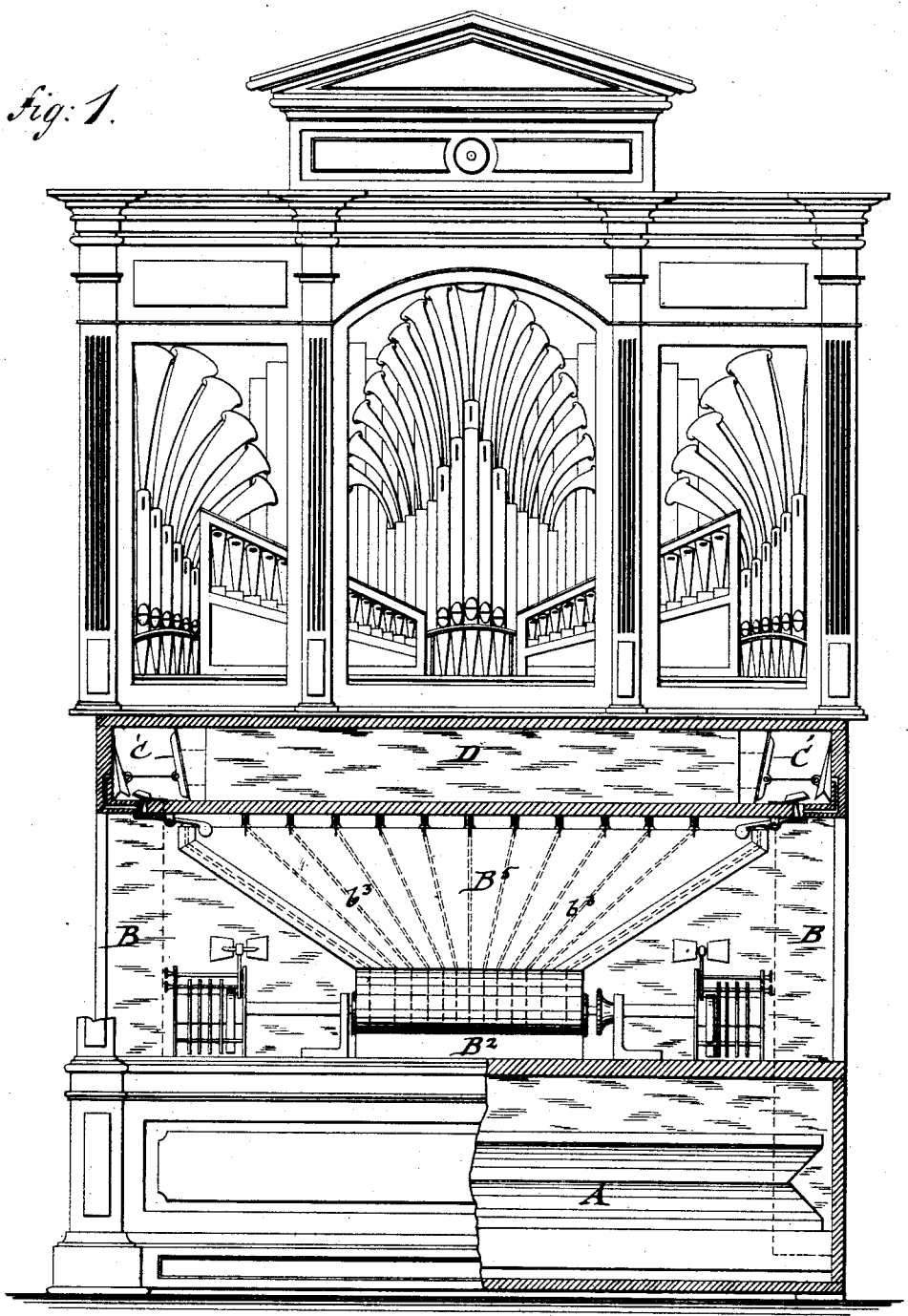

Witnesses:
   H. W. BEADLE,
   WM. T. EMERSON.